United States Patent
Kollar (10) Patent No.: US 7,057,869 B2
(45) Date of Patent: Jun. 6, 2006

(54) METHOD FOR PROTECTING AT LEAST ONE CONSUMER AGAINST OVERVOLTAGES AND DEVICE FOR CARRYING OUT THE METHOD

(75) Inventor: Hans-Jürgen Kollar, Bruchsal (DE)

(73) Assignee: Sew-Eurodrive GmbH & Co., Bruchsal (DE)

( * ) Notice: Subject to any disclaimer, the term of this patent is extended or adjusted under 35 U.S.C. 154(b) by 586 days.

(21) Appl. No.: 10/433,345

(22) PCT Filed: Nov. 10, 2001

(86) PCT No.: PCT/EP01/13027

§ 371 (c)(1),
(2), (4) Date: May 30, 2003

(87) PCT Pub. No.: WO02/45227

PCT Pub. Date: Jun. 6, 2002

(65) Prior Publication Data
US 2004/0022002 A1   Feb. 5, 2004

(30) Foreign Application Priority Data
Dec. 1, 2000  (DE) ............................... 100 60 038
Jan. 18, 2001  (DE) ............................... 101 01 988

(51) Int. Cl.
*H02H 9/00* (2006.01)

(52) U.S. Cl. ....................................... 361/91.1; 361/62

(58) Field of Classification Search ............... 361/91.1, 361/62
See application file for complete search history.

(56) References Cited

U.S. PATENT DOCUMENTS

| 5,734,256 | A | | 3/1998 | Larsen et al. ................ 307/33 |
| 5,889,384 | A | * | 3/1999 | Hayes et al. ................ 320/108 |
| 6,005,304 | A | * | 12/1999 | Seelig ......................... 307/104 |
| 6,462,432 | B1 | | 10/2002 | Seelig et al. ................ 323/207 |

FOREIGN PATENT DOCUMENTS

DE  197 35 624  12/1998

\* cited by examiner

*Primary Examiner*—Stephen W. Jackson
(74) *Attorney, Agent, or Firm*—Kenyon & Kenyon LLP (57) ABSTRACT

A method and a device for protecting at least one consumer against overvoltages when working with a method for non-contact transmission of electric power from one or more medium-frequency current sources, whose frequencies may have deviations around medium frequency $f_M$, to the at least one moving consumer via one or more transmission lines and transformer heads, allocated to the consumers, having a downstream matching controller for adjusting the power received from the transmission line; a transmission line is fed from a medium-frequency current source with a medium-frequency current that is constant in its effective value during the power transmission; the respective consumer is supplied with energy by at least one matching controller having at least one feed-in; one or more fed currents are rectified in each instance in a rectifier, smoothed in each instance by a link-circuit reactor and brought together; with the aid of a switch, the link-circuit current, brought together in each instance, is either supplied to a link-circuit capacitor buffering output voltage $U_=$ of the matching controller, or is shunted upstream of the link-circuit capacitor, depending upon the power demand of the consumers; and the voltage $U_=$ at at least one link-circuit capacitor is compared to a predefinable value, and if this value is exceeded, an electronic power circuit-breaker is turned on for shunting the link-circuit current.

14 Claims, 5 Drawing Sheets

METHOD FOR PROTECTING AT LEAST ONE CONSUMER AGAINST OVERVOLTAGES AND DEVICE FOR CARRYING OUT THE METHOD

FIELD OF THE INVENTION

The present invention relates to a method for protecting at least one consumer against overvoltages and a device for carrying out the method.

BACKGROUND INFORMATION

German Published Patent Application No. 197 35 624 describes a method for the non-contact transmission of electric power from a medium-frequency current source having a medium frequency $f_M$ to one or more moving consumers via a transmission line, and from transformer heads, allocated to the moving consumers, having a downstream matching controller for adjusting the power received from the transmission line, the transmission line being fed from the medium-frequency current source with a medium-frequency current that is constant in its effective value during the power transmission.

The matching controller converts the medium-frequency current, injected from the transformer head, into a DC voltage. As described in FIGS. 3, 7a and 7b and the associated description of German Published Patent Application No. 197 35 624, switch $T_S$ is operated synchronously with respect to the characteristic, and with double the frequency of the input current of the matching controller. However, an important disadvantage is that this high switching frequency $2f_M$ results in high switching losses. Another disadvantage is that the synchronous principle can no longer be maintained when using a plurality of asynchronously operating feed-ins for supplying a matching controller.

In the case of German Published Patent Application No. 197 35 624, a relay is used which, after the matching controller is switched in, goes into the blocking state with low voltage. Upon switch-off or in response to a short-circuit in the region of this low voltage, the relay returns again to the conductive state. It may be disadvantageous that the relay is subject to mechanical wear, and therefore may lead to an accident. It may also be disadvantageous that in German Published Patent Application No. 197 35 624, in case of an emergency, a dangerously high voltage may occur at the consumer, which may lead to accidents.

Therefore, it is an object of the present invention to increase safety when working with a matching controller, e.g., to avoid the danger of fire in the event of an emergency or during unusual operating conditions.

SUMMARY

The objective may be achieved according to the present invention in the case of the method for protecting at least one consumer from overvoltages, according to the features described herein, and in the case of the device for use when working with such a method, according to the features described herein.

Features of the present invention with respect to an example embodiment of the method for non-contact energy transmission are that energy is transmitted from one or more medium-frequency current sources, whose frequencies may have small deviations around medium frequency $f_M$, to at least one moving consumer via one or more transmission lines and transformer heads, allocated to the consumers, having a downstream matching controller for adjusting the power received from the transmission line; a transmission line is fed from a medium-frequency current source with a medium-frequency current that is constant in its effective value during the power transmission; the respective consumer is supplied with energy by at least one matching controller having at least one feed-in; one or more fed currents are rectified in each instance in a rectifier, smoothed in each case by a link-circuit reactor and brought together; with the aid of a switch (S, V1), the link-circuit current, brought together in each instance, is either supplied to a link-circuit capacitor buffering output voltage $U_=$ of the matching controller, or is shunted upstream of the link-circuit capacitor, depending upon the power demand of the consumers; and voltage $U_=$ at at least one link-circuit capacitor is compared to a fixed or pre-definable value, and if this value is exceeded, an electronic power circuit-breaker (V4, Thy) is turned on for shunting the link-circuit current.

In this context, it may be provided that the overvoltage protection becomes active in case of an emergency. For example, such a case of emergency exists in the event the low voltage supply for the driving of switch (S, V1) fails, or given a controller defect, etc. In that case, the voltage at the link-circuit capacitor increases and may reach dangerous values. This may possibly happen if the entire system is overloaded and/or when the matching controller is undersupplied, as well. In these cases, the link-circuit current may be shunted, and a further increase of the voltage at the link-circuit capacitor may be prevented.

Another aspect is that the overvoltage protection may be executable in a wear-free fashion, and it may not be necessary to use any mechanical parts such as relays, etc. In particular, sparking may be prevented, and operation may be made possible in areas at risk for explosion.

In emergency cases which are not caused by breakdown or destruction, after resetting the matching controller or after shutting down the system and/or eliminating the cause, reuse of the matching controller may be possible.

In an example embodiment of the present invention, the electronic power circuit-breaker may be a thyristor which, after firing, may only be blocked upon disappearance of the current shunted through it. This arrangement may be cost-effective, and after firing, no further driving may be necessary.

In an example embodiment of the present invention, the signal electronics for generating the driving signal for the electronic power circuit-breaker may be supplied from the voltage at the link-circuit capacitor. This may provide that no special voltage supply such as an emergency battery, etc. is necessary.

According to an example embodiment of the present invention, the signal electronics for generating the driving signal for the electronic power circuit-breaker may include a positive feedback. After the critical voltage has been exceeded, the overvoltage protection may be activated and may stabilize itself.

In an example embodiment according to the present invention, the respective switch may be switched in such a manner that switching frequency 1/T is less than double the medium frequency, thus, $1/T<2f_M$.

In this context, it may be provided that the switching losses may be less than for methods which assume a switching frequency of $2 f_M$, and that not only synchronously operating, but also a plurality of asynchronously operating feed-ins may be usable for supplying a matching controller. In addition, the current flow is controllable by a single switch.

According to an example embodiment of the present invention, switching frequency 1/T may be selected as a value between 0.5 $f_M$ and 1.5 $f_M$. It may be possible to use a link-circuit reactor having the smallest possible size, accompanied by the lowest possible switching losses.

In an example embodiment of the present invention, the switch may be switched periodically with a frequency 1/T and asynchronously with respect to one or more medium-frequency feed-ins such that there may be no constant phase relationship to the currents of one or more feed-ins. The method may be robustly executable, and it may be possible to save on device(s) for synchronization.

In an example embodiment according to the present invention, the link-circuit reactor may be arranged so that the link-circuit current does not pulsate during operation. A continuous power flow may be ensured in spite of the aforesaid low switching frequency.

According to an example embodiment of the present invention, the frequencies of the medium-frequency feed-ins may have deviations around $f_M$. The feed-ins may not have to be synchronized with each other.

Features of the present invention with respect to an example embodiment of the device are that the device(s) for driving the respective switch include no device(s) for synchronization to the medium-frequency feed-ins. The driving may be simple, cost-effective and, in particular, robust with respect to interference effects when working with asynchronously operating feed-ins.

In an example embodiment according to the present invention, the anode voltage of thyristor (Thy, V4) may correspond to the maximum from voltage at the link-circuit capacitor and voltage at switch (S, V1). This may provide that no dangerously high voltage changes per time occur at the thyristor.

According to an example embodiment of the present invention, the anode of the thyristor may be connected via a diode to at least one link-circuit reactor and/or the anode of the thyristor may be connected via a resistor R1 to link-circuit capacitor C6. The diode may decouple the region of the current rectified by the link-circuit reactor and the region of the consumer or utilization voltage. Consequently, in the blocking state, the thyristor may be supplied with a voltage without dangerously high voltage changes per time, and in the conductive state, the link-circuit current may be able to be shunted via the thyristor with the aid of the indicated diode.

In an example embodiment of the present invention, the device(s) for driving the respective switch may include a modulator having rising and falling edges running in a linear fashion over time, the amount of the gradient of the rising and falling edges being selectable to be different. A sawtooth-shaped modulator signal may be used which may be inexpensive and uncomplicated to generate.

In an example embodiment according to the present invention, a matching controller may have a plurality of feed-ins, that in each case feed a rectifier, whose output currents are in each instance brought together via a link-circuit reactor, and a switch may be connected in series such that the link-circuit current is either supplied to a link-circuit capacitor buffering output voltage $U_=$ of the matching controller, or is shunted upstream of this link-circuit capacitor, depending on the power demand of the consumer connected to the matching controller. This may provide that not only synchronously operating, but also asynchronously operating feed-ins may be used.

In an example embodiment according to the present invention, the output voltages of two or more matching controllers may be parallel-connected via diodes for supplying a consumer. The power able to be made available may be increased as needed.

In an example embodiment of the present invention, the anode of the thyristor may be connected via a diode V3 to at least one link-circuit reactor. A decoupling of the alternating component, particularly of the high-frequency voltage component, may be therefore attainable.

In an example embodiment of the present invention, the anode of the thyristor may be connected via a resistor R1 to link-circuit capacitor C6. This may provide that the voltage change per time dU/dt may be able to be limited below a critical value, such that no firing of the thyristor is triggered as a result of such critically high voltage changes per time dU/dt.

REFERENCE NUMERAL LIST 1 infeed controller (ESS)
2 gyrator
3 matching transformer
4 transmission line
5 transformer head with power factor correction capacitor
6 matching controller (APS)
7 consumer
21 feed-in
22 rectifier
23 link-circuit reactor
25 switch
S, V1 switch
26 diode
C6, 27 link-circuit capacitor
$I_=$ output current of the matching controller
$I_Z$ link-circuit current
$I_{ZV}$ smoothed signal of the link-circuit current
$I_{SZ}$ sawtooth-shaped modulator signal
$I_{ST}$ control signal
$I_A$ current source, output current of the gyrator
$I_Ü$ current in the transmission line
$U_{setpoint}$ setpoint voltage
$U_=$ output voltage of the matching controller
$U_A$ output voltage of the infeed controller
$C_G$ gyrator capacitance
$L_G$ gyrator inductance
Ü transformation voltage ratio of the matching transformer
$w_2$ number of turns of the transformer head
$f_M$ medium frequency
$K_D$ gain of the attenuator
$K_U$ gain of the voltage controller
$T_2$ time constant of the attenuator
$T_3$ delay-time constant of the connection-of-load
$S_{on}$ trip-on signal for switch
R1, R2, R3, R4, R5, R6, R7, R8, R9 resistor
C1, C2, C3, C4, C5 capacitor
V2, V3, V7 diode
V4 thyristor
V5 field-effect transistor
V6 transistor
V8 Zener diode
N1 shunt regulator Example embodiments of the present invention shall now be explained below with reference to the figures.

DETAILED DESCRIPTION

Figure 1:
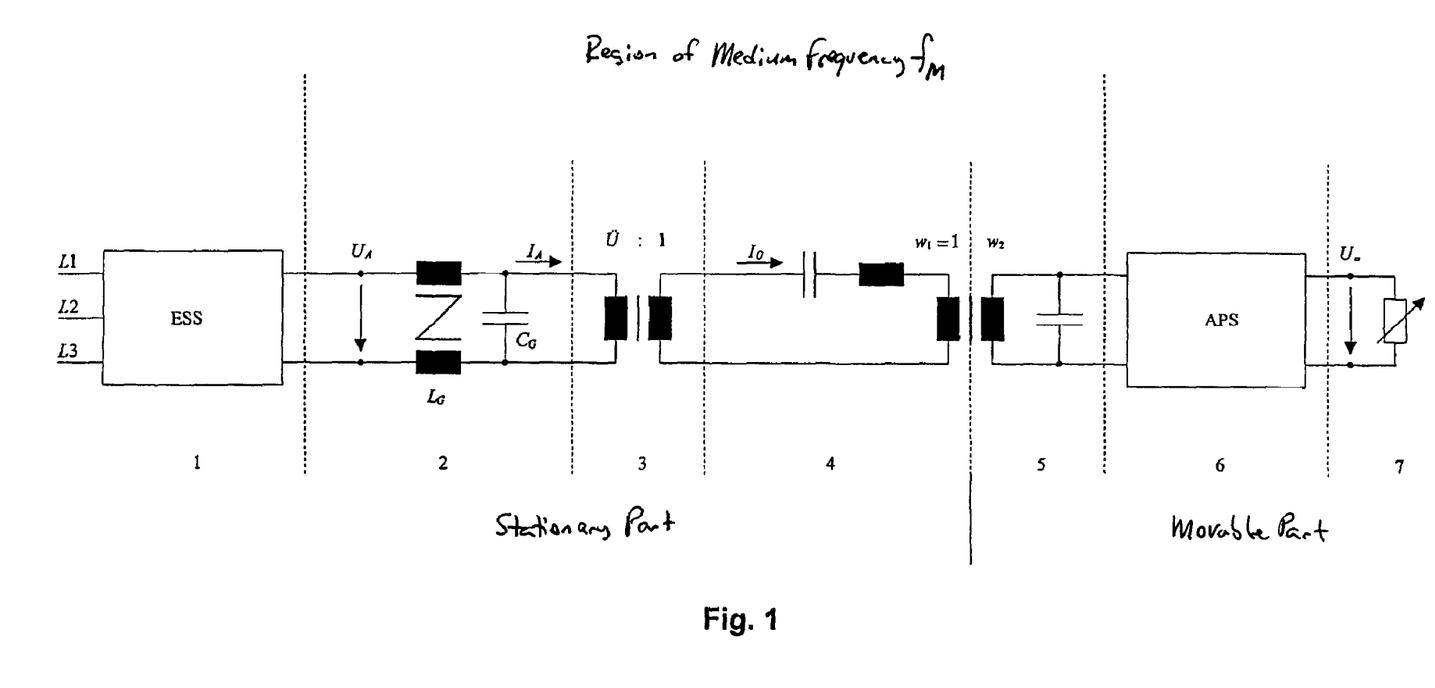
FIG. 1 is an exemplary schematic diagram for non-contact energy transmission having a matching controller 6.

FIG. 1 illustrates a first exemplary schematic diagram for non-contact energy transmission having a matching controller 6. It includes a stationary part and a movable part.

The stationary part includes an infeed controller 1, a gyrator 2, a matching transformer 3 and a transmission line 4.

Infeed controller 1 converts the low-frequency AC voltage received from three-phase system (L1, L2, L3) into a medium-frequency voltage $U_A$ having a constant medium frequency $f_M$ of, for example, 25 kHz. A resonantly operated series resonant circuit, so-called gyrator 2, connected in series to infeed controller 1, represents a voltage-controlled current source $I_A$. Gyrator capacitance $C_G$ and gyrator inductance $L_G$ are rated in accordance with medium frequency $f_M$ and the nominal power of infeed controller 1.

Current source $I_A$ feeds a matching transformer 3 whose transformation voltage ratio Ü is such that a medium-frequency current $I_{\ddot{U}}$, which is constant in its effective value, flows in transmission line 4, regardless of the nominal power of infeed controller 1.

The movable part includes a transformer head 5 having a power-factor correction capacitor, a matching controller 6 and a consumer 7. Transmission line 4 has an elongated conductor, to which coil windings of transformer head 5 are inductively coupled such that energy is transmitted to the movable part. In this context, transformer head 5 has a number of turns $w_2$, which determines the current intensity of a feed-in at matching controller 6.

Matching controller 6 converts the medium-frequency current, injected from transformer head 5, into a DC voltage $U_=$. In an exemplary embodiment, this voltage is used for feeding a conventional frequency converter as consumer 7, in order to implement a speed-adjustable drive on the movable part.

Figure 2:
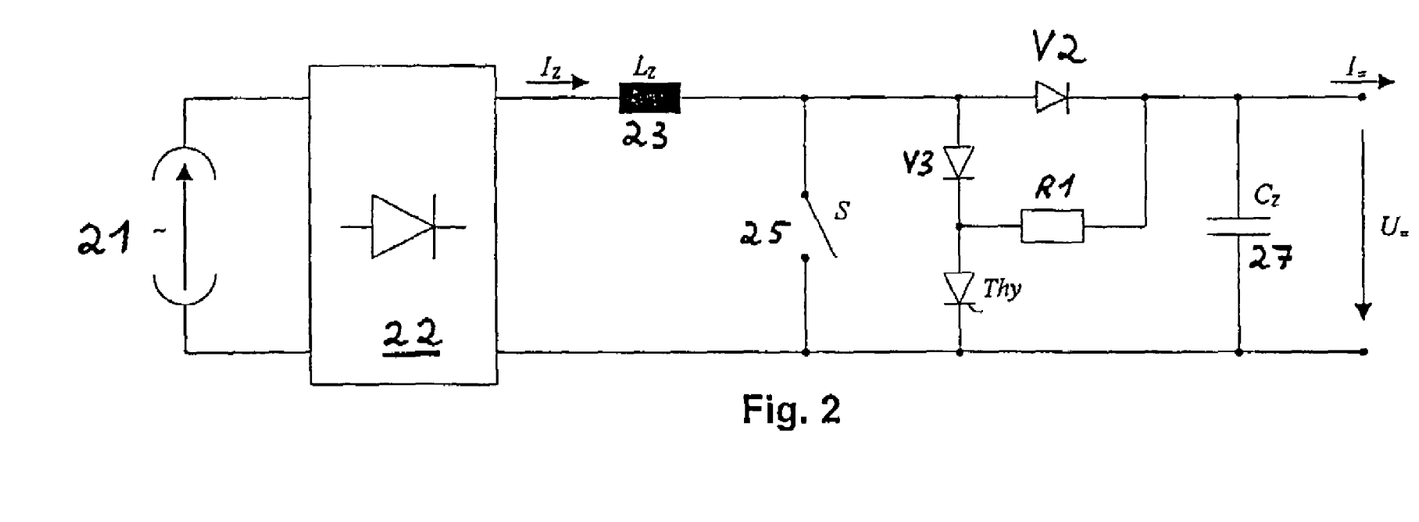
FIG. 2 is an exemplary schematic diagram of the matching controller with thyristor for protection against overvoltages.

The current transferred from transmission line 4 to transformer head 5 represents a feed-in 21. As illustrated in FIG. 2, this current is rectified in a rectifier 22 of matching controller 6, is smoothed by a link-circuit reactor 23, and with the aid of a switch 25, is either supplied to link-circuit capacitor 27 buffering output voltage $U_=$ of matching controller 6, or is shunted upstream of this link-circuit capacitor 27, depending on the power demand of consumer 7 connected to matching controller 6.

Figure 4:
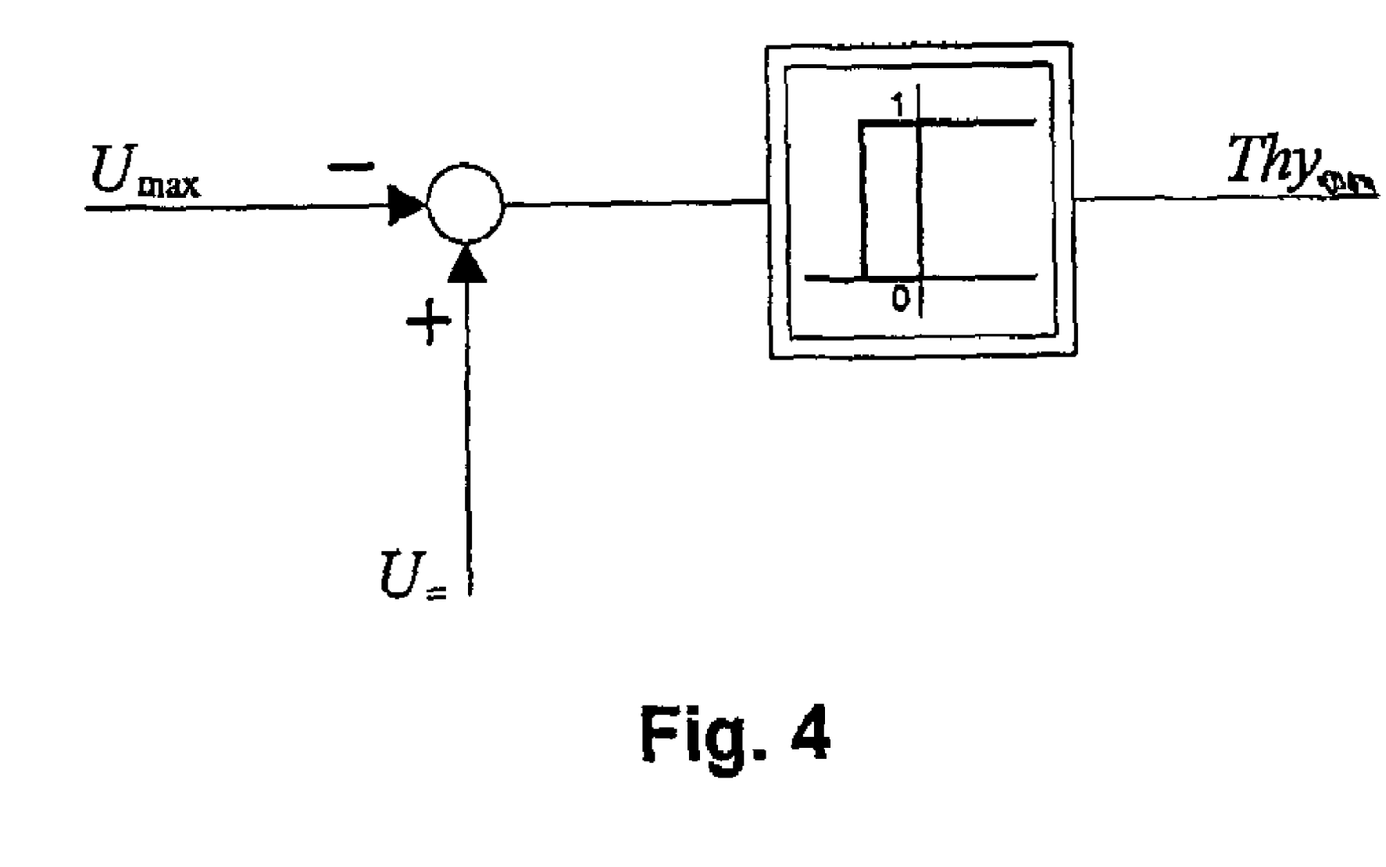
FIG. 4 illustrates generation of the requisite thyristor driving signal.

In addition, FIG. 2 illustrates a thyristor Thy as electronic power circuit-breaker, with which, via diode V3, the current, smoothed by link-circuit reactor 23, is able to be transmitted in the event of an unacceptably high output voltage $U_=$, thus an overvoltage, occurring at consumer 7. The generation of requisite driving signal $Thy_{on}$ of thyristor Thy is illustrated in FIG. 4. In this context, output voltage value $U_=$ is compared to a maximum allowed voltage value $U_{Max}$. If this maximum allowed voltage value $U_{Max}$ is exceeded, thyristor Thy is then fired. Only when the current shunted through the thyristor disappears or becomes less than the holding current does thyristor Thy block or go into the blocking state again. This is able to be effected, for example, in that switch (S, V1) is closed.

FIG. 2 also illustrates a resistor R1 which may eliminate or at least sharply reduces the fluctuations in the voltage applied at thyristor Thy, in particular strongly attenuates the high-frequency component of the voltage applied at thyristor Thy.

In cases of emergency, such as an overloading of the infeed controller, an under-supply of the matching controller, a short-circuit in the low-voltage supply of the signal electronics of the matching controller, which are used for generating the driving signals for switch (S, V1), or in the event of a failure of an essential part in these signal electronics, the voltage at the link-circuit capacitor may reach dangerously high values and lead to damages. The overvoltage protection of the present invention may prevent such damages.

Figure 3:
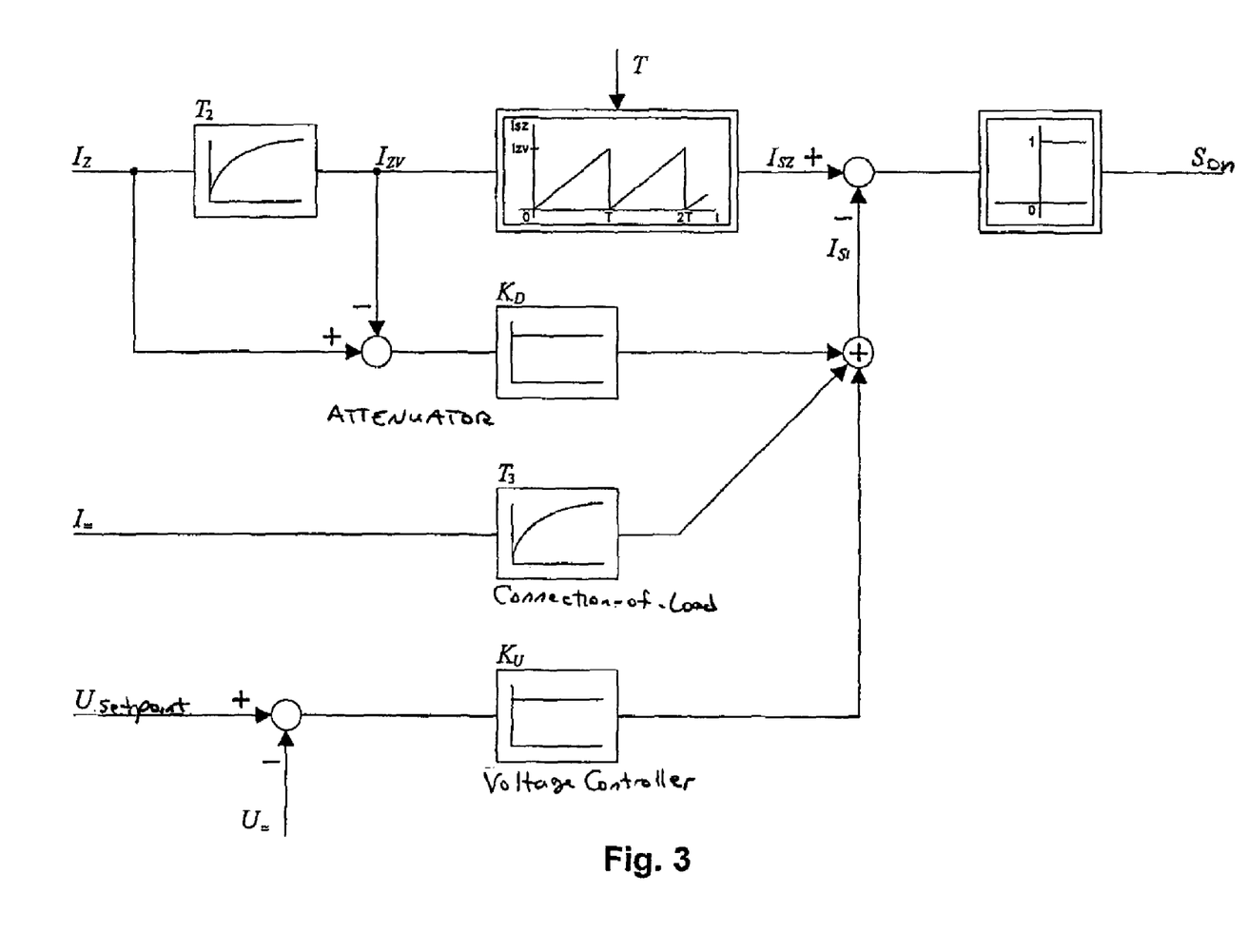
FIG. 3 is a schematic diagram of the control and driving of the matching controller for an exemplary embodiment.

FIG. 3 is a schematic diagram of the control and driving of switch 25 of the matching controller for an exemplary embodiment. Non-linear elements are double-framed, and linear elements are single-framed.

The linear part includes the following components: P-voltage controller of or with gain $K_U$, connection-of-load with a delay time constant $T_3$, and attenuator, including time-delay element with time constant $T_2$ and proportional element of or with gain $K_D$.

The non-linear part includes a modulator and a two-point or two-position element which generates a trip-on signal $S_{on}$ for switch 25. The input quantity of the two-point element is formed from the difference between a sawtooth-shaped modulator signal $I_{SZ}$ and a control signal $I_{ST}$.

The amplitude of the sawtooth-shaped modulator signal is determined by smoothed signal $I_{ZV}$ of the link-circuit current. Frequency 1/T of the modulator signal is predefined asynchronously with respect to frequency $f_M$ of feed-in 21.

Control signal $I_{ST}$ is made of the sum of the output signals of the P-voltage controller, the connection-of-load and the attenuator.

The output signal of the P-voltage controller is yielded by the difference, weighted by a proportional element, between setpoint voltage $U_{setpoint}$ and output voltage $U_=$ of the matching controller.

To form the output signal of the connection-of-load, output current $I_=$ of the matching controller is supplied to a time-delay element having delay time $T_3$.

The output signal of the attenuator is yielded by the difference, weighted by a proportional element, between link-circuit current $I_Z$ and smoothed signal $I_{ZV}$ of the link-circuit current. The gain of the proportional element is $K_D$.

The control and driving may provide the following functions:

The voltage controller is arranged as a simple P-controller, since the connection-of-load preselects trip-on signal $S_{on}$ of switch 25 in a pre-controlling manner, which means the voltage controller is substantially unloaded.

The attenuator damps natural oscillations of link-circuit current $I_Z$ in the oscillatory configuration composed of inductive transformer head 5 with power factor correction capacitor, rectifier 22 and link-circuit reactor 23.

In other exemplary embodiments of the present invention, instead of sawtooth-shaped modulator signal $I_{SZ}$, a periodic modulator signal having rising and falling edges running in a linear fashion over time may be used, the amount of the gradient of the rising and falling edges being selectable to be different. If the amount of the gradient of the two edges is equal, a triangular characteristic results.

Thus, in contrast to German Published Patent Application No. 197 35 624, not only may such a triangular modulator signal be used, but also in particular the sawtooth-shaped modulator signal which is easy to generate and is used in the exemplary embodiment of the present invention.

In the exemplary embodiments according to the present invention, amplitude and period duration T are each selected as in the case of the sawtooth-shaped modulator signal described. In this context, period duration T is selected as a fixed value from a 10%-wide tolerance band around $1/f_M$. Therefore, the switching of switch 25 is asynchronous with respect to the characteristic of the current of feed-in 21. There is no fixed phase relationship.

The switching losses of electronically designed switch 25 may be inversely proportional to switching frequency $1/T$. Thus, sharply reduced switching losses result because of the large period duration T used.

The dimensioning of the link-circuit reactor is determined by the use of large period duration T, the asynchronous operation and the requirement that the link-circuit current not pulsate during operation, in order to provide a continuous power flow.

It may be provided when using this 10%-wide tolerance band that the link-circuit reactor has the smallest possible size, accompanied by the lowest possible switching losses.

For other exemplary embodiments according to the invention, a value from a 50%-wide tolerance band around $1/f_M$ is also usable as period duration T.

Figure 5:
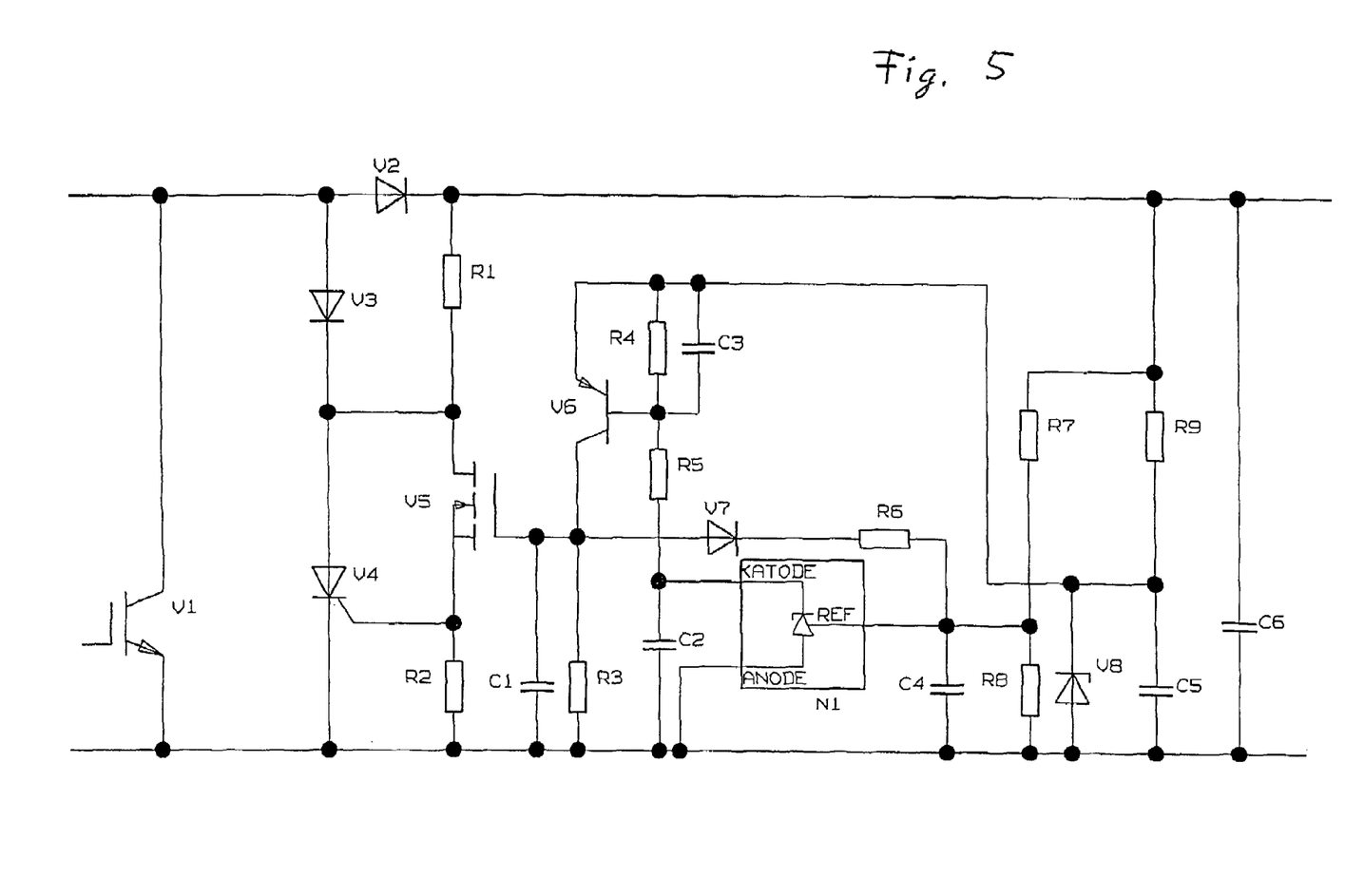
FIG. 5 is an exemplary circuit diagram of the entire overvoltage protection according to an example embodiment of the present invention.

FIG. 5 is a circuit diagram of the entire overvoltage protection with generation of the driving signal as an exemplary embodiment of the present invention.

During normal operation, the overvoltage protection is not active, since the voltage at the link-circuit capacitor does not reach a critical value. If, however, in the case of an emergency, the low-voltage supply for driving electronic switch V1 fails or functions incorrectly, for example, in response to a controller defect, etc., the voltage at the link-circuit capacitor increases and may reach dangerous values. This may also happen in response to an overloading of the entire system and/or when the matching controller is under-supplied. In these cases, the overvoltage protection becomes active.

From the voltage smoothed by link-circuit capacitor C6, a voltage supply for the overvoltage-protection signal electronics, described in the following, is formed via series resistor R9 and Zener diode V8. In this context, capacitor C5 smooths the voltage applied at Zener diode V8.

The voltage divider, formed from resistors R7 and R8, generates from the link-circuit voltage a signal voltage which represents a measured value for the link-circuit voltage, evaluated by the signal electronics, and which is filtered and/or smoothed by capacitor C4.

This signal voltage is influenced, on the one hand, by the positive feedback formed from diode V7 and resistor R6, and is used on the other hand as input for shunt regulator N1.

Shunt regulator N1 may operate when a critical voltage value is reached. The output of shunt regulator N1 is inverted by a voltage-level converter, which is formed from transistor V6 and resistors R4 and R5, used as positive feedback (V7, R6), which increases the voltage at capacitor C4, thus at the input of shunt regulator N1, and therefore stabilizes the active state of the overvoltage protection, and is supplied to the gate of a field-effect transistor V5. This field-effect transistor V5 forms a first step or prestage for driving thyristor V4. The DC voltage and AC voltage components of the voltage at the gate of field-effect transistor V5 are brought approximatively to zero by resistor R3 and capacitor C1.

Resistor R1 stabilizes the voltage applied at the anode of thyristor V4 to the level of the smoothed voltage applied at link-circuit capacitor C6. Therefore, no unacceptably high voltage changes per time dU/dt are reached which could fire or damage thyristor V4.

Resistor R2 lowers the voltage at the gate such that thyristor V4 is held in the blocked state as long as field-effect transistor V5 remains blocked. If field-effect transistor V5 becomes conductive, thyristor V4 is also fired and then shunts the link-circuit current via diode V3. Thyristor V4 only goes into the blocking state again after a drop below the holding current or disappearance of the current conducted through it.

Capacitors C2 and C3 are in turn used for interference suppression.

To summarize, the overvoltage protection thus operates such that after a critical voltage at link-circuit capacitor C6 has been exceeded, thyristor V4 is fired. Only after the link-circuit voltage has dropped below the maximum allowed voltage value $U_{Max}$ and after a drop below the holding current or disappearance of the current flowing through thyristor V4, may thyristor V4 block or go into the blocking state again.

This drop below the holding current or disappearance of the current may occur, for example, by the fact that switch V1 is switched through, or the matching controller becomes currentless.

In other exemplary embodiments of the present invention, instead of field-effect transistor V5, an IGBT or integrated-gate bipolar transistor, a bipolar transistor or a suitable electronic switch may be used. In addition, all parts and components may be replaced by other components which exhibit a corresponding behavior. In particular, upon deactivation of the overvoltage protection, the forward voltage at switch V1 may be less than the sum of the forward voltages of diode V3 and of thyristor V4 upon a drop below the holding current of thyristor V4.

In further exemplary embodiments of the present invention, two or more feed-ins may also be used. In this case, the fed currents are in each instance rectified in a rectifier, smoothed in each instance by a link-circuit reactor, and brought together. Using a single switch, link-circuit current $I_Z$ is either fed to the link-circuit capacitor buffering output voltage $U_=$ of the matching controller, or is shunted upstream of this link-circuit capacitor, depending on the power demand of the consumer connected to the matching controller.

In this manner, not only two synchronously operating feed-ins, but also two asynchronously operating feed-ins are usable for supplying the matching controller.

Thus, in a first exemplary embodiment of the present invention, the transformer heads draw energy from the same line. In this case, the feed-ins operate synchronously.

In a second exemplary embodiment of the present invention, the transformer heads draw energy from two different lines. In this case, each line is supplied by one infeed controller, the frequencies of the medium-frequency current source of the respective infeed controllers having at least small deviations. The feed-ins operate asynchronously. This operation is made possible by smoothing the respective rectified current of the corresponding feed-in, using in each case a link-circuit reactor prior to bringing the currents together.

In other exemplary embodiments according to the present invention, the transformer heads draw energy from a plurality of different lines. In this case, each line is supplied by one infeed controller, the frequencies of the medium-frequency current source of the respective infeed controllers having small deviations. The feed-ins operate asynchronously. This operation may be made possible only by the smoothing of the respective rectified current of the corresponding feed-in, using in each case a link-circuit reactor prior to bringing the currents together.

The circuit diagrams and controls illustrated and described are to be understood only as schematic diagrams. The layout and alteration for practical implementation of the present invention should be apparent to one skilled in the art.

In other exemplary embodiments of the present invention, the medium frequency deviates from the value of 25 kHz indicated by way of example. Medium frequencies in the range of 10 kHz to 50 kHz are also possible.

What is claimed is:

1. A method for protecting at least one consumer against overvoltages, comprising:
    non-contactly transmitting electric power from at least one medium-frequency current source having frequencies that deviate around medium frequency to at least one moving consumer via at least one transmission line and transformer head allocated to the consumers and including a downstream matching controller configured to adjust power received from the transmission line;
    supplying a transmission line from a medium-frequency current source with a medium-frequency current constant in an effective value during power transmission;
    supplying a respective consumer with energy by at least one matching controller including at least one feed-in;
    rectifying at least one fed current in a rectifier;
    smoothing the at least one fed current by a link-circuit reactor;
    bringing together the at least one fed current to form a link-circuit current;
    one of supplying the link-circuit current to a link-circuit capacitor buffering an output voltage of the matching controller and shunting the link-circuit current upstream of the link-circuit capacitor in accordance with a power demand of the consumers and in accordance with a switch;
    comparing the output voltage at at least one link-circuit capacitor to one of a fixed and a predefinable value; and
    turning on an electronic power circuit-breaker to shunt the link-circuit current in accordance with the output voltage exceeding the on of th fixed and the predefinabl value.

2. The method according to claim 1, wherein the electronic pow r circuit-breaker includes a thyristor blocked, after firing, one of only after a drop below a holding current and upon disappearance of the current shunted therethrough.

3. The method according to claim 2, further comprising applying an alternating component of a voltage at the thyristor that does not reach a high critical value of voltage change per time so that firing of the thyristor is triggered by the alternating component.

4. The method according to claim 1, wherein the current smoothed by the link-circuit reactor does not have a high critical value of current change per time so that firing of a thyristor of the electronic power circuit-breaker is triggered by an alternating component of the current.

5. The method according to claim 1, wherein a voltage at the switch includes an alternating component higher than a critical value of voltage change per time that would trigger firing of a thyristor of the electronic power circuit-breaker if applied to the thyristor.

6. The method according to claim 1, further comprising decoupling an alternating component of a voltage applied at the switch so that at a voltage change per time at a thyristor of the electronic power circuit-breaker does not reach a critical values that firing of the thyristor is triggered.

7. The method according to claim 1, further comprising supplying signal electronics configured to generate a driving signal for the electronic power circuit-breaker from the voltage at the link-circuit capacitor.

8. The method according to claim 7, wherein the signal electronics include a positive feedback arrangement.

9. A d vice, comprising:
    an arrangement configured to perform a method for protecting at least one consumer against overvoltages, the method including:
        non-contactly transmitting electric power from at least one medium-frequency current source having frequencies that deviate around medium frequency to at least one moving consumer via at least one transmission line and transformer head allocated to the consumers and including a downstream matching controller configured to adjust power received from the transmission line;
        supplying a transmission line from a medium-frequency current source with a medium-frequency current constant in an effective value during power transmission;
    supplying a respective consumer with energy by at least one matching controller including at least one feed-in;
    rectifying at least one fed current in a rectifier;
    smoothing the at least one fed current by a link-circuit reactor;
    bringing together the at least one fed current to form a link-circuit current;
    one of supplying the link-circuit current to a link-circuit capacitor buffering on output voltage of the matching controller and shunting the link-circuit current upstream of the link-circuit capacitor in accordance with a power demand of the consumers and in accordance with a switch;
    comparing the output voltage at at least one link-circuit capacitor to a fixed and a predefinable value; and
    turning on an electronic power circuit-breaker to shunt the link-circuit current in accordance with the output voltage exceeding the one of the fixed and the predefinabl valu;
    wherein the matching controller includes a circuit configured to protect against overvoltages at the link-circuit capacitor, the circuit including at least one electronic power circuit-breaker configured to shunt, in a conductive state, link-circuit current from the at least one link-circuit reactor upstream of at least one of the link-circuit capacitor and a decoupling diode.

10. The device according to claim 9, wherein the at least one link-circuit reactor is connected to the link-circuit capacitor via the diode.

11. The device according to claim 9, wherein the electronic power circuit-breaker includes a thyristor arranged to be blocked after firing only upon disappearance of current shunted therethrough.

12. The device according to claim 11, wherein an anode voltage of the thyristor corresponds to a maximum from voltage at the link-circuit capacitor and voltage at the switch.

13. The device according to claim 12, wherein an anode of the thyristor is connected to the at least one link-circuit reactor via a diode.

14. The device according to claim 12, wherein an anode of the thyristor is connected to the link-circuit capacitor via a resistor.

* * * * *

UNITED STATES PATENT AND TRADEMARK OFFICE
CERTIFICATE OF CORRECTION

| | | |
|---|---|---|
| PATENT NO. | : 7,057,869 B2 | Page 1 of 1 |
| APPLICATION NO. | : 10/433345 | |
| DATED | : June 6, 2006 | |
| INVENTOR(S) | : Hans-Jurgen Kollar | |

It is certified that error appears in the above-identified patent and that said Letters Patent is hereby corrected as shown below:

Title Page, item 54, change "AGAINST OVERVOLTAGE TAGES AND" to --AGAINST OVERVOLTAGES AND-- ;

Column 1, line 2, change "AGAINST OVERVOLTAGE TAGES AND" to --AGAINST OVERVOLTAGES AND-- ;

Column 9, line 48, change "on of th fixed and the predefinabl" to --one of the fixed and predefinable-- ;

Column 9, line 51, change "pow r" to --power-- ;

Column 10, line 12, change "d vice" to --device-- and

Column 10, line 43, change "predefinabl valu" to --predefinable value--.

Signed and Sealed this

Twentieth Day of November, 2007

JON W. DUDAS
*Director of the United States Patent and Trademark Office*